UNITED STATES PATENT OFFICE.

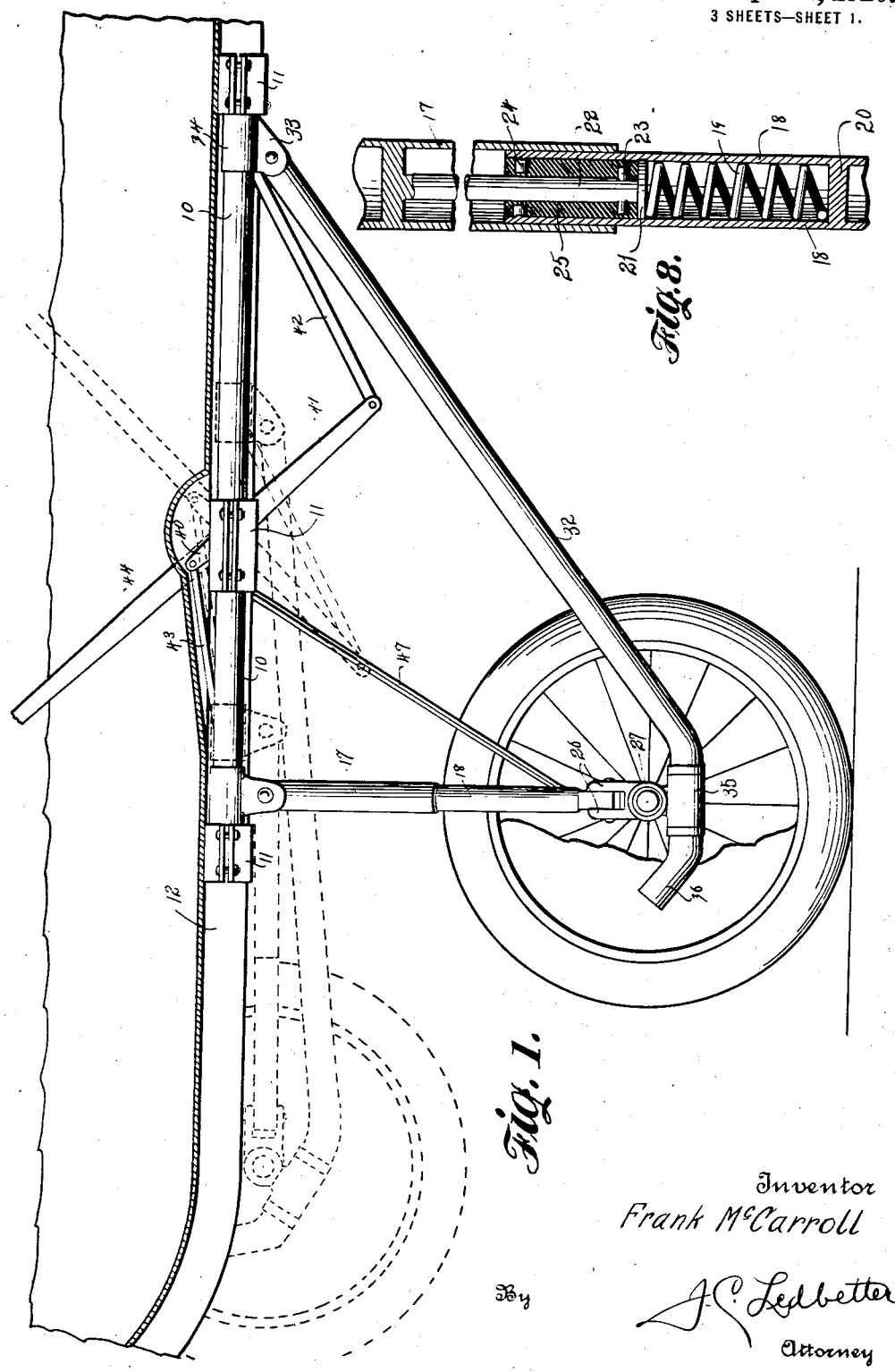

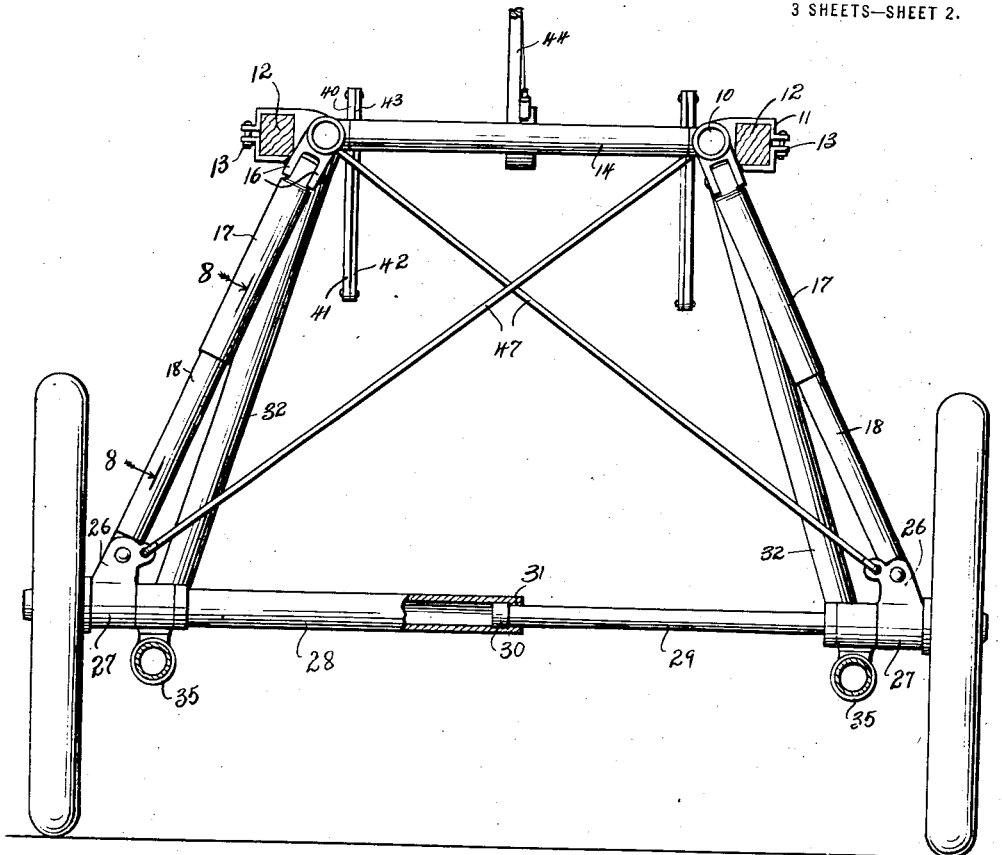
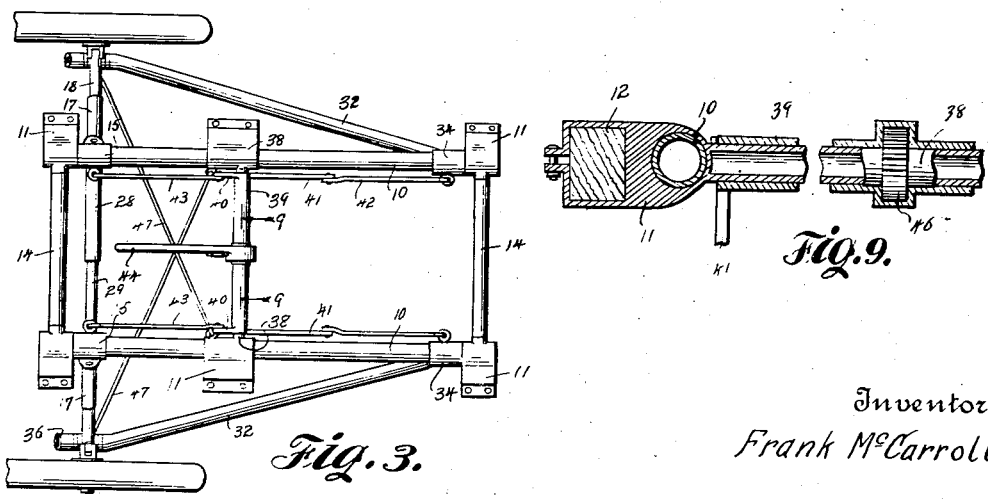

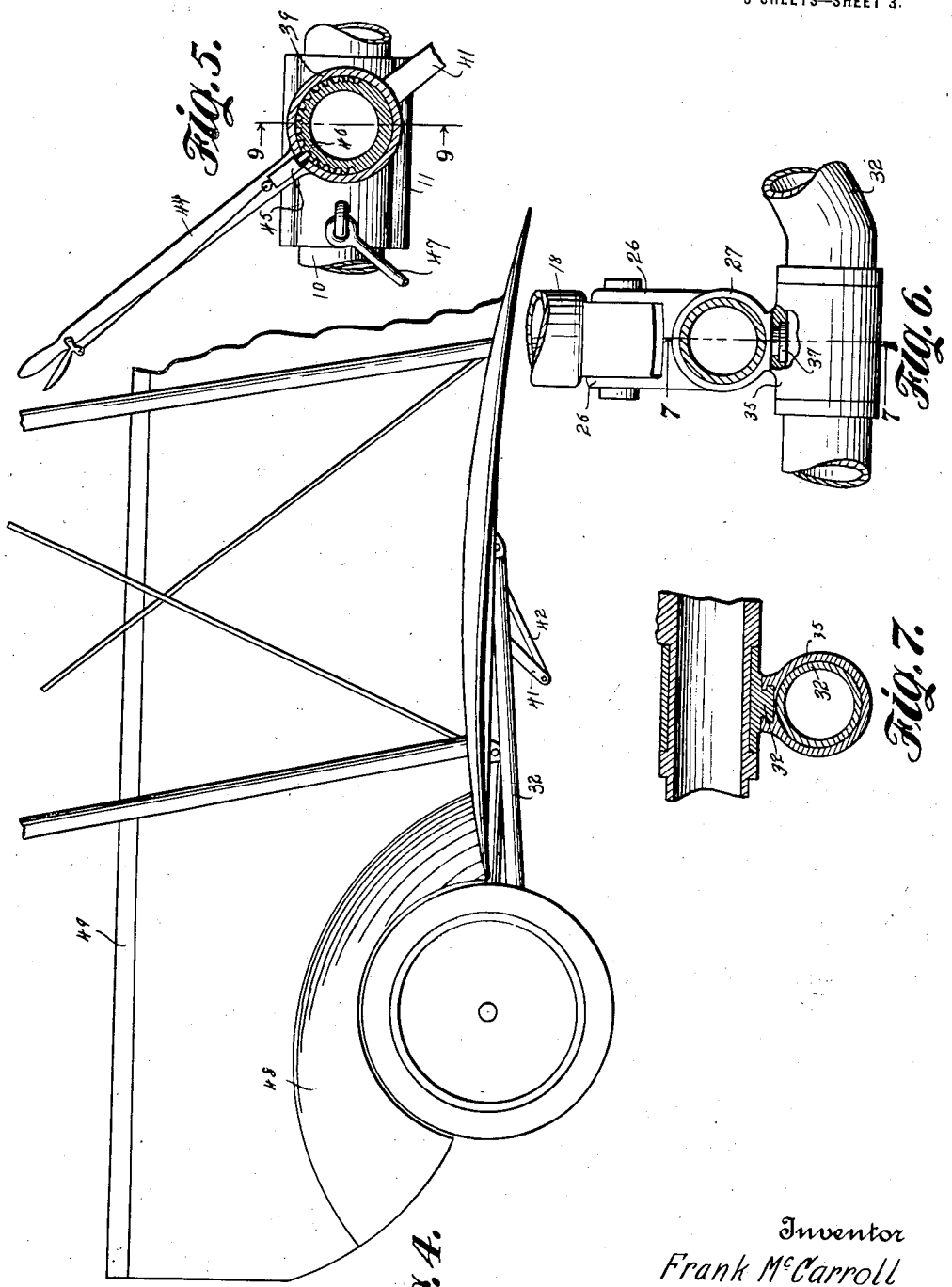

FRANK McCARROLL, OF DALLAS, TEXAS.

FOLDABLE LANDING-GEAR FOR AEROPLANES.

1,353,407.      Specification of Letters Patent.      Patented Sept. 21, 1920.

Application filed July 19, 1919. Serial No. 311,948.

*To all whom it may concern:*

Be it known that I, FRANK McCARROLL, a citizen of the United States, residing at Dallas, in the county of Dallas and State of Texas, have invented certain new and useful Improvements in Foldable Landing-Gears for Aeroplanes, of which the following is a specification.

This invention relates to aeroplanes and landing gear therefor. More specially the invention relates to a foldable type landing gear for aeroplanes and other aircraft.

An object of the invention is to provide the design of an aeroplane landing gear which will fold into upwardly disposed position and lay adjacent the fuselage or body of said plane.

Another purpose is to provide a foldable landing gear capable of being folded and unfolded from the aviator's seat in order that the aviator may lift the landing gear upwardly along side the fuselage after the plane has taken to the air and adapted to be unfolded into a landing position as the machine descends to alight.

A further object of the invention is to employ shock absorbers or resilient members in connection with the landing gear or under-carriage which will impart a steady and yieldable supporting tendency to the body of the plane as the plane alights. It is also a feature to provide streamline inclosure pockets into which the wheels of the landing gear will register when said wheels are moved into upwardly folded position.

With the above principal objects, and others, in view, the invention has relation to a certain combination and arrangement of aeroplane landing gear parts, an example of which is portrayed in the following description, delineated in the appended claims, and illustrated in the accompanying drawings, wherein:

Figure 1 shows a side elevation of the foldable landing gear structure disposed in alighting position, and shown in dotted lines to be in upwardly folded position.

Fig. 2 shows a front view of the foldable landing gear detached from the fuselage or aeroplane body.

Fig. 3 shows a plan view of the landing gear removed from the aeroplane body.

Fig. 4 shows a side elevation of the landing gear mounted upon a fragmentary view of an aeroplane, said landing gear being moved in an upwardly folded position with the plane represented in flight.

Fig. 5 illustrates a sectional detailed view taken upon the line 5—5 of Fig. 3.

Fig. 6 shows a detailed sectional view of one of the brace and landing gear strut joints shown in connection with the device.

Fig. 7 shows a view taken upon the line 7—7 of Fig. 6.

Fig. 8 shows a detailed sectional view taken on the line 8—8 of Fig. 2, in order to illustrate the shock absorber means employed.

Fig. 9 shows a detailed sectional view taken upon the line 9—9 of Fig. 3.

A landing gear constructed according to the present specifications and claims of this disclosure comprises a telescoping axle fitted with the usual ground wheels. A pair of longeron tubes are employed for mounting the device on the fuselage body of an aeroplane, and a pair of foldable braces with a pair of landing gear struts are associated with the longeron tubes. A lever is correlated with the device and adapted to move the braces and landing gear struts into an upwardly folded position.

Referring now more in particular to the drawings, the reference numeral 10 designates a pair of spaced longeron tubes. Each longeron tube is fitted with several longeron clamps 11. These clamps are fixed to the tubes and provided with a square receptacle through which may be inserted the longerons or main beams 12 of an aeroplane. The members 12 constitute the main frame of an aeroplane body, and it is to these members 12 that the device is attached. The clamps are provided with suitable bolts 13 which allows the clamps to be opened or loosened on the side to permit the insertion of the longerons 12. Spacer tubes 14 are integrally made with or welded to the longeron clamps 11 and act to space the longeron tubes apart in fixed relation. The tubes 14 thus brace the structure and add to the strength of the fuselage of the aeroplane.

On the forward end of each longeron tube is pivotally confined a cuff 15 provided with a pair of integral out-spaced ears 16. The cuffs 15 are journaled upon the end of the longeron tubes. A landing gear strut is pivotally mounted in the ears 16 of each cuff. Each landing gear strut comprises a pair of telescope members 17 and 18, with the upper end thereof secured between the ears by a pin which permits the telescoping strut to pivot on the cuff. A shock absorbing spring 19 is confined between the web 20 and a fixed piston 21. The piston 21 is secured to the upper telescoping member 17 while the lower end of the spring is seated against the web 20 integrally formed in the tube 18. This provides a resilient support for the tube 17 upon tube 18, and in this manner the weight of the aeroplane is transmitted through the spring 19 to the lower member 18. It may be desirable to employ rubber shock absorbing means and in such case the rod 22 which carries the piston 21 will be fitted with a pin 23, and the tube 18 will be provided with pins 24. The two sets of pins 23 and 24 are adapted to move relatively one with the other when the shock absorbing system is undergoing action. A shock absorbing plug 25 is placed in the tube 18 with the pin sets 24 and 23 imbedded therein. The shock absorbing plug will undergo compression and tension during the telescoping action of the landing gear strut. The above described shock absorbing means is provided in each landing gear strut.

The lower end of the strut section 18 is pivotally confined between ears 26, said ears integrally formed with a cuff 27. An axle member is carried on the lower end of each landing gear strut and mounted in the two cuffs 27. The axle comprises telescoping members 28 and 29. The axle part 28 telescopically receives the member 29. The axle part 29 is fitted on the end thereof with a shoulder head 30, said shoulder head is confined in the tube 28. The tube 28 is provided with a shoulder 31 abutting the shoulder head 30. The two shoulders act to form a solid axle member and prevent spreading of the landing gear when the aeropane alights. The axle parts 28 and 29 will telescope one on the other when the landing gear is folded up, as later seen.

A brace 32 is employed on each side of the landing gear with the upper end thereof pivoted to ears 33 integrally formed on a cuff 34. The cuff 34 is slidably confined upon the longeron tube 10. The lower end of the brace 32 is rotatably mounted in the cuff 35, and the forward end of this brace 32 is turned up at 36 to form a skid to prevent the landing gear parts from digging into the ground in case the aeroplane lands on soft soil or in case the wheels collapse. The cuff 35 is pivotally mounted on a stud 37, said stud being fixed to the sleeve 27. This permits the cuff 35 to rotate upon the stud during the upward folding movement and during the telescoping action of the axle parts 28 and 29. The above described brace equipment is provided on each side of the landing gear structure.

The Fig. 1 shows the near wheel removed to expose to view the cuff 35 and associate parts, and the Fig. 6 shows the cuff 35 pivoted upon the cuff 27, said view being illustrated in section.

A central spacer tube 38 is fixed to the longeron tubes 10, and a tube 39 is rotatably confined upon the spacer tube 38. The tube 39 is provided with upper arms 40 and lower arms 41, said arms being integrally and substantially formed upon the tube member 39. Links 42 are employed to connect the levers 41 with the cuffs 34. The links 42 are connected to the cuffs 34 by an eye and to the levers 41 with a pin. Links 43 join the cuffs 15 with the arms 40. A hand lever 44 is fixed to the tube 39 and employed to rotate said tube upon the spacer member 38.

Thus when the hand lever 44 is moved rearwardly the levers 41 travel downwardly and exert a pull on the cuffs 34 which slides said cuffs 34 forward along the longeron tubes 10. This action on the part of the lever moves the landing gear struts forward and about the pivotal point in the ears 16. Simultaneously with this action the links 43 draw the cuffs 15 rearwardly which moves the upper ends of the landing gear struts rearwardly along the tubes 10 until all parts assume the position shown in dotted lines in Fig. 1.

The hand lever 44 is provided with a pawl and ratchet mechanism comprising the ratchet bolt 45 guided through a hole formed in the tube 39. A toothed rack 46 is formed on the spacer member 38 and engageable by the ratchet 45 of the hand lever. Thus the hand lever is locked in fixed position when the landing gear is pivoted in upwardly or downwardly displaced position.

Should it be necessary to employ additional bracing means other than the brace members 32, there is shown a pair of diagonal rods or wires 47. The lower ends of the diagonal braces 47 are attached to an eye formed in each of the ears 26, while the upper ends of said braces are secured to eyes integrally formed on the central longeron clamps 11. The eye connections on the diagonal braces permit freedom of movement between the braces and joined parts so that no interference or restriction of movement occurs when the landing gear is moved into folded flight position.

In Fig. 4 there is shown a stream line pocket 48 built on the side of the fuselage 49 of the aeroplane. These wheel pockets 48 are employed to partly receive the wheels when the gear is folded in upward position. This reduces head resistance of the wheels passing through the air.

It may be desirable to design this foldabl landing gear so it will fold into the body of the machine. In such case it will only be necessary to form receptacles in the lower portion of the fuselage into which the wheels will move when folded up. In order to have as broad gage tread as possible the present drawings show the wheels folded into stream line position and into the stream line pockets formed on the outside of the fuselage.

The aviator can readily control the operation of the foldable landing gear from the hand lever 44. After the aviator drives his plane into the air he will pull the lever 44 rearwardly which action moves the braces 32 forwardly and upwardly, and the upper portion of the parts 17 move rearwardly. Simultaneously with this action the telescoping axle parts 28 and 29 slide one upon the other until the wheels assume a narrow and relatively close position. The latter period of the lever movement will complete the folding action and dispose the wheels upwardly into the stream line pockets 48. The foldable landing gear will then assume the appearance shown in Fig. 4 thereby presenting very little frictional surface to the air, which very materially reduces the head resistance of the plane in flight.

An aeroplane equipped with this type of foldable landing gear will have a greater radius of flight since its miles per hour is increased. This type of foldable landing gear is especially designed for use in connection with aeroplanes having square fuselage bodies.

Where an aeroplane is designed and constructed with the intention of installing this type of gear, the longeron may be made round and inserted within the longeron tube and thereby eliminate the use of the longeron clamps 11. But where the aeroplane has already been built and it becomes desirable to equip said plane with this foldable type of landing gear, it will be only necessary to remove the old landing gear and substitute the foldable gear here described by installing same upon the lower longeron members 12 of the aeroplane fuselage. In this manner the foldable landing gear may be installed on an aeroplane in a very short time by attaching the several clamps 11 shown. The present drawings disclose six longeron clamps 11, and it is thought that this is sufficent to provide a substantially strong and stiff assembly when the landing gear has been anchored to the fuselage body. A special feature of the present landing gear resides in the ability of the aeroplane mechanics to very carefully adjust the center of ground running balance of the plane. Should the wheels of the running gear be placed a little too far forward or to the rear of the preferred point of mounting, the longeron clamps 11 will be loosened and the complete landing gear, as a unit, moved rearwardly or forwardly to correct the ground running balance of the plane. The present design of landing gear is built as a unit and can be installed and removed in a very short time by one or two mechanics.

In my application for patent filed 19 day of October, A. D. 1918, under the Serial No. 258,867, I have shown another form of foldable landing gear which has special characteristics adapting it for use in connection with the V type or angular shape fuselage. This last indicated invention will, therefore, be employed on V-shaped fuselages or aeroplanes, while the present disclosure provides the preferred form of foldable landing gear for use on present day rectangular-shaped fuselage or aeroplane body.

Having thus described my invention, what I claim as new, and desire to secure by Letters Patent is:

1. A foldable landing gear comprising; a pair of spaced longeron tubes attachable to and detachable from the longerons of an aeroplane fuselage, a landing gear strut pivoted on each longeron tube, an axle carried by the landing gear struts, and braces associated with each longeron tube and each landing gear strut.

2. A foldable landing gear comprising; a pair of spaced longeron tubes attachable to and detachable from the longerons of an aeroplane fuselage, a pivoted landing gear strut carried on each longeron tube, an axle carried by the landing gear struts, braces associated with each longeron tube and each landing gear strut, and means for folding the aforesaid parts into an upwardly disposed position.

3. A foldable landing gear attachment for air craft comprising; a pair of longeron tubes, clamps fixed thereto, to fasten the attachment to the fuselage of aircraft, cuffs slidably mounted on the tubes, landing gear struts pivotally carried on the cuffs, a telescoping axle carried by the landing gear struts and braces employed between the landing gear struts and longeron tubes.

4. A foldable landing gear attachment for aircraft comprising; a pair of longeron tubes, clamps fixed thereto, to fasten the attachment to the fuselage of aircraft, cuffs slidably mounted on the tubes, landing gear struts pivotally carried on the cuffs, a telescoping axle carried by the landing gear struts, braces employed between the landing gear struts and longeron tubes, and shock absorbing means arranged in each landing gear strut.

5. A foldable landing gear comprising; a pair of longeron tubes, clamps fixed thereto, cuffs slidably mounted thereon, landing gear struts pivotally carried on the cuffs, a telescoping axle carried by the landing gear struts and braces employed between the landing gear struts and longeron tubes, shock absorbing means fitted in each landing gear strut, and means for folding the above aforesaid landing gear into upward position to reduce head resistance.

6. A foldable landing gear comprising; a pair of spaced longeron tubes, provided with a front and rear set of sliding cuffs, a hand lever, a pair of links attached to the hand lever and connecting with each set of cuffs, a landing gear strut carried by the front cuffs, a wheel axle carried by the landing gear struts, and a pair of braces associated with the landing gear struts and the longeron tubes to brace the landing gear.

7. A foldable landing gear comprising; a pair of spaced longeron tubes, a pair of braces with the upper ends thereof slidably associated with the longeron tubes, a pair of landing gear struts pivotally mounted upon the forward end of the longeron tubes, with means for pivotally joining the braces to the lower portion of the landing gear struts, and means provided for folding the landing gear in upward position.

8. A foldable landing gear comprising, a pair of spaced longeron tubes, clamps for joining the longeron tubes to the fuselage of a standard model aeroplane, a landing gear strut pivoted on each longeron tube and depending therefrom, a wheel carried on each strut, and a brace connecting each landing gear strut with each longeron tube.

9. A foldable landing gear comprising, a pair of spaced longeron tubes, clamps for joining the longeron tubes to the fuselage of a standard model aeroplane, a landing gear strut pivoted on each longeron tube and depending therefrom, a wheel carried on each strut, a brace connecting each landing gear strut with each longeron tube, and a collapsible axle joining the lower end of each landing gear strut.

10. A foldable landing gear comprising, a pair of spaced longeron tubes, clamps for joining the longeron tubes to the fuselage of a standard model aeroplane, a landing gear strut pivoted on each longeron tube and depending therefrom, a wheel carried on each strut, a brace connecting each landing gear strut with each longeron tube, a collapsible axle joining the lower end of each landing gear strut, a tube rotatably confined between the longeron tubes, a lever secured to the tube, connecting means interposed between the tube and the landing gear struts for moving the struts when the lever is moved, and connecting means interposed between the tube and the braces for moving the said braces when the lever is moved to execute an upwardly folding action of the wheels and braces.

11. A landing gear for aircraft, said landing gear being capable of folding up in streamline position with the fuselage of the craft, and characterized as new by employing a telescoping axle as a part of the landing gear, a lever placed in suitable position to be operated by the aviator, whereby the axle telescopes to decrease the tread thereof and simultaneously folds upwardly.

12. A foldable landing gear for aircraft, comprising an appropriately constructed frame attached to the craft, a telescoping axle carried by the frame, ground wheels carried on the axle, and said landing gear capable of folding upwardly and simultaneously decreasing its tread.

13. A foldable landing gear for aircraft, comprising spaced longerons incorporated into the fuselage of the craft, depending axle struts pivotally carried on the longerons, a telescoping axle carried by the struts, landing wheels mounted on the axle, braces arranged between the longerons and axle to maintain the landing gear in properly extended alighting position, and control means provided to simultaneously fold the axle upwardly telescoping its parts, whereby the landing gear assumes a streamline position adjacent the fuselage.

In testimony whereof I affix my signature.

FRANK McCARROLL.

Witnesses:
R. H. VOGEL,
CHAS. R. RUSSELL.